United States Patent
Loeffler et al.

(10) Patent No.: US 11,065,923 B2
(45) Date of Patent: Jul. 20, 2021

(54) WHEEL UNIT, SYSTEM FOR TRANSMITTING DATA FROM A WHEEL UNIT, AND METHOD FOR TRANSMITTING DATA FROM A WHEEL UNIT

(71) Applicant: CONTINETAL AUTOMOTIVE GMBH, Hannover (DE)

(72) Inventors: Michael Loeffler, Zeitlarn (DE); Sylvain Godet, Saint-Cezert (FR); Stephane Dufour, Castelginest (FR)

(73) Assignee: Continental Automotive GmbH, Hannover (DE)

( * ) Notice: Subject to any disclaimer, the term of this patent is extended or adjusted under 35 U.S.C. 154(b) by 320 days.

(21) Appl. No.: 16/082,017

(22) PCT Filed: Feb. 2, 2017

(86) PCT No.: PCT/EP2017/052300
§ 371 (c)(1),
(2) Date: Sep. 4, 2018

(87) PCT Pub. No.: WO2017/148649
PCT Pub. Date: Sep. 8, 2017

(65) Prior Publication Data
US 2020/0307325 A1   Oct. 1, 2020

(30) Foreign Application Priority Data
Mar. 4, 2016 (GB) ..................... 1603738

(51) Int. Cl.
*B60C 23/04* (2006.01)

(52) U.S. Cl.
CPC ...... *B60C 23/0454* (2013.01); *B60C 23/0464* (2013.01); *B60C 2200/04* (2013.01)

(58) Field of Classification Search
CPC ............ B60C 23/0231; B60C 23/0408; B60C 23/0416; B60C 23/0454; B60C 23/0457;
(Continued)

(56) References Cited

U.S. PATENT DOCUMENTS 6,469,989 B1 * 10/2002 Ernst .................... H04B 1/1615
  370/311
7,212,105 B2   5/2007 Okubo
(Continued)

FOREIGN PATENT DOCUMENTS

EP  1524133 A1  4/2005
EP  1702769 A2  9/2006
(Continued)

*Primary Examiner* — Orlando Bousono
(74) *Attorney, Agent, or Firm* — Laurence A. Greenberg; Werner H. Stemer; Ralph E. Locher

(57) ABSTRACT

A wheel unit for a system for transmitting data from the wheel unit to a receiver of a vehicle. The wheel unit is configured for mounting to a wheel of the vehicle, and the wheel unit includes the following: a memory for storing wheel type data related to the type of the wheel at which the wheel unit is mounted; a processor for processing the wheel type data stored in the memory; a transmitter for RF-transmitting data telegrams to a vehicle-mounted receiver. The processor determines an RF power value based on the stored wheel type data, and the transmitter transmits the data telegrams with an RF power based on the determined RF power value.

14 Claims, 3 Drawing Sheets

(58) Field of Classification Search
CPC ............ B60C 23/0462; B60C 23/0464; B60C 23/0488; B60C 2200/04; H04B 1/707; H04L 5/023
See application file for complete search history.

(56) References Cited

U.S. PATENT DOCUMENTS

| | | | |
|---|---|---|---|
| 7,385,485 B2 | 6/2008 | Thomas et al. | |
| 9,491,723 B2 | 11/2016 | Huot et al. | |
| 9,776,461 B2 | 10/2017 | Okada et al. | |
| 2004/0046651 A1* | 3/2004 | Norimatsu | B60C 23/0462 |
| | | | 340/445 |
| 2005/0078002 A1* | 4/2005 | Okubo | B60C 23/0408 |
| | | | 340/445 |
| 2005/0104715 A1* | 5/2005 | Farrell | B60C 23/0408 |
| | | | 340/5.64 |
| 2005/0109094 A1* | 5/2005 | Umegaki | B60C 23/0464 |
| | | | 73/146 |
| 2006/0220805 A1* | 10/2006 | Thomas | B60C 23/0464 |
| | | | 340/426.33 |
| 2008/0238637 A1 | 10/2008 | Ghabra et al. | |
| 2009/0009311 A1* | 1/2009 | Escarpit | B60C 23/0433 |
| | | | 340/447 |
| 2013/0076500 A1* | 3/2013 | Yu | B60C 23/0464 |
| | | | 340/445 |
| 2014/0073260 A1* | 3/2014 | Bettecken | B60C 23/044 |
| | | | 455/66.1 |
| 2014/0368327 A1 | 12/2014 | Darrer et al. | |
| 2016/0082791 A1 | 3/2016 | Lin | |
| 2016/0167459 A1* | 6/2016 | Okada | B60C 23/0445 |
| | | | 340/447 |

FOREIGN PATENT DOCUMENTS

| | | |
|---|---|---|
| WO | 2010007475 A1 | 1/2010 |
| WO | 2015015692 A1 | 2/2015 |

* cited by examiner

WHEEL UNIT, SYSTEM FOR TRANSMITTING DATA FROM A WHEEL UNIT, AND METHOD FOR TRANSMITTING DATA FROM A WHEEL UNIT

FIELD OF THE INVENTION

The present invention relates to a wheel unit for a system for transmitting data from the wheel unit to a receiver of a vehicle, wherein the wheel unit is designed to be mounted to a wheel of the vehicle, and wherein the wheel unit comprises:
- a storage for storing wheel type data related to the type of the wheel at which the wheel unit is mounted,
- a processor for processing the wheel type data stored in the storage,
- a transmitter for RF-transmitting data telegrams to a vehicle-mounted receiver.

Further, the invention relates to a system for transmitting data from such a wheel unit to a receiver of a vehicle. Further, the invention relates to a method for transmitting data from such a wheel unit to a receiver of a vehicle.

BACKGROUND OF THE INVENTION

A wheel unit advantageously enables to automatically retrieve the respective wheel type data, for example tire type data, by an on-board electronics of the vehicle, or by a dedicated external receiver device (RFID reader) for checking the wheel type data stored in the storage of the wheel unit.

Thus, an automatic retrieval of for example tire type data from a wheel unit mounted to a vehicle wheel can be advantageously used as such in a "tire information system" (TIS). In this case, the RF-transmitted data telegrams can comprise one or more data elements of the tire type data stored in the wheel unit.

Furthermore, tire type data stored in a wheel unit for a system for transmitting operating data related to an operation of the respective vehicle wheel, as e.g. a tire pressure and a tire air temperature, may be advantageously used for improving the performance of such system, e.g. a "tire pressure monitoring system" (TPMS). In a TPMS, a wheel unit which is typically mounted to a rim or a tire of the respective vehicle wheel measures at least the tire pressure (and preferably additional operating data) and provides this information via RF transmission in the form of data telegrams to a vehicle-mounted receiver.

In such systems for transmitting data from a wheel unit of a vehicle wheel to a receiver of the vehicle, an RF power with which the transmission takes place is typically set to a fixed value, such that a reliable data transfer is accomplished. Since the same type of wheel unit is intended for use in different types of vehicles or different types of wheels, the RF power has to be chosen high enough for meeting the requirements in terms of reliability also in unfavourable cases (e.g. application environment with relatively high RF-shielding). Such a provision of a relatively high RF power adversely affects the power consumption of the wheel unit.

It is therefore an object of the present invention to reduce the power consumption of a wheel unit used in a system or in a method for RF-transmitting data from the wheel unit mounted to a wheel of a vehicle to a receiver of the vehicle.

DESCRIPTION OF THE PRIOR ART

The document US 2014/0368327 A1 describes an RFID tag unremovably mounted into a tire of a vehicle wheel, comprising a storage which is configured to store information related to a tire identification, wherein the information may represent a type of tire with its according properties. Such tire type data may specify e.g. the dimensions of the tire as well as e.g. a maximum speed, a maximum load etc.

SUMMARY OF THE INVENTION

According to a first aspect of the present invention, a wheel unit for a system for transmitting data from the wheel unit to a receiver of a vehicle is disclosed. The wheel unit is designed to be mounted to a wheel of the vehicle and comprises a storage for storing wheel type data related to the type of the wheel at which the wheel unit is mounted, a processor for processing the wheel type data stored in the storage and a transmitter for RF-transmitting data telegrams to a vehicle-mounted receiver.

The processor is designed to determine an RF power value based on the stored wheel type data and the transmitter is designed to transmit the data telegrams with an RF power based on the determined RF power value.

For example, the processor is designed to determine an RF power value as a function of the stored wheel type data and the transmitter is designed to transmit the data telegrams with an RF power, wherein the RF power is a function of the determined RF power value.

The invention is based on the finding that the properties of an actually mounted vehicle wheel may have a significant impact on the amount of shielding of RF signals transmitted by the wheel unit. In general, for example, the broader the rim of the wheel, the more metal surrounds the wheel unit and with that the transmitted RF signal is attenuated much more. Based on this finding, the invention proposes to transmit the data telegrams not with a predetermined RF power, i.e. an RF power having a fixed value, but with a variable RF power which is adapted to meet the requirements in the actual application environment. This is achieved by determining (e.g. calculating) an RF power value based on the wheel type data stored in the storage of the wheel unit, and subsequently causing the transmitter to transmit the data telegrams with an RF power based on the previously determined RF power value.

Advantageously, it is e.g. possible to automatically adapt the RF power after a change of the wheel, e.g. a tire change and/or a rim change. Consequently, the invention allows reducing the power consumption of the wheel unit. If the wheel unit is powered by a battery, the battery lifetime is advantageously extended.

In an embodiment, the processor is designed to determine a change of the wheel based on a change of the stored wheel type data. The processor may further be designed to determine the RF power value based on the changed wheel type data if the processor determines a change of the wheel. Thus, the change of the wheel, e.g. the tire change and/or the rim change, may be detected automatically by the processor based on a change of the stored wheel type data and the RF power may be adapted automatically, if a change of the wheel is detected by the processor.

In an embodiment, the processor is designed to conduct a calculation based on one or more data elements contained in the wheel type data.

For example, if the wheel type data contain a data element representing the width of the tire and/or a data element representing the width of the rim, the processor may calculate the RF power value by means of a predefined determination algorithm, wherein this determination algorithm takes into account an influence of the tire width (and/or rim width).

The respective dependency of the RF shielding effect (e.g. a "damping factor") from the respective width(s) may be previously established e.g. based on experimental data and then used in the design of said algorithm.

The same applies for other factors different from a width of the tire or rim, respectively, which may have an influence on the RF shielding effect and thus an influence on the setting of a suitable RF power value. Examples of such other factors are a diameter of the tire (and/or the rim) and the material (and/or structure) of the tire (and/or the rim).

In an embodiment, the processor is designed to retrieve one or more values of the RF power value from a look-up table stored in the storage based on one or more data elements contained in the wheel type data.

The use of such a look-up table in the determination of the RF power value is e.g. very advantageous in the case of (one or more) data elements in the wheel type data, which do not represent a quantitative representation of a physical property of the tire (and/or rim), but rather identifies a particular type or e.g. model of the tire or rim, respectively. Such identifying data element may e.g. be a code, which is unique for a particular tire or rim model, respectively, of a particular manufacturer. In such case, the look-up table may advantageously allow the processor to retrieve relevant quantitative information (e.g. RF damping factor) from the look-up table, in which such quantitative factors are assigned to each of the possible identification codes.

As mentioned above, an identification code may identify a particular model (of a tire or a rim) of a particular manufacturer. However, such identification code may also identify e.g. only a manufacturer, if a dependency between the manufacturer and the RF shielding effect of products (tires or rims) of that manufacturer exists.

In this respect, the conduction of (one or more) calculations can also be combined with the use of a look-up table for determining the RF power value by the processor. For example, the look-up table may provide one or more values, which then are subjected to one or more subsequent calculations, which finally result in the RF power value. Alternatively or additionally, a result of at least one calculation based on the wheel type data may also be used to retrieve a value from the look-up table, which is then used as said RF power value or which will be used to determine said RF power value by means of a further calculation.

After the RF power value has been determined by the processor, the transmitter is caused to transmit the data telegrams with an RF power based on the determined RF power value. In an embodiment, the RF power value is simply a representation (indication) of the RF power (e.g. expressed in milliwatts).

According to a further aspect of the present invention, a system for transmitting data from a wheel unit designed to be mounted to a wheel of a vehicle to a receiver of the vehicle is disclosed. The system comprises a wheel-mounted wheel unit as described above with reference to the first aspect of the present invention and a vehicle-mounted receiver for RF-receiving data telegrams transmitted by the wheel unit.

All embodiments and particular features described herein with reference to the wheel unit according to the first aspect of the present invention may advantageously be used also in an analogous way as embodiments or further developments of the system according to the further aspect of the present invention.

According to a yet further aspect of the present invention, a method for transmitting data from a wheel unit mounted to a wheel of a vehicle to a receiver of the vehicle is disclosed. The method comprises storing wheel type data related to the type of the wheel at which the wheel unit is mounted in a storage of the wheel unit, processing the wheel type data stored in the storage by a processor of the wheel unit and RF-transmitting data by a transmitter of the wheel unit to the receiver of the vehicle. Processing the wheel type data comprises determining an RF power value based on the stored wheel type data. The RF-transmitting is conducted with an RF power based on the determined RF power value.

All embodiments and particular features described herein with reference to the wheel unit or the system according to the previous aspects of the present invention can be also used in an analogous way for embodiments or further developments of the method according to the further aspect of the invention.

In particular, the method may further comprise determining a change of the wheel based on a change of the stored wheel type data.

Moreover, determining the RF power value may comprise determining an RF power value based on the changed wheel type data if a change of the wheel has been determined.

In an embodiment of the invention, the wheel type data comprise information in the form of one or more data elements, which allows the processor to obtain information about a diameter of the wheel and/or information about a width of the wheel. Further information of interest may be a material (RF shielding property of this material), which may be achievable based on the wheel type data (as the case may be by an identification of the manufacturer of the respective tire and/or the respective rim).

In an embodiment of the invention, the wheel unit is designed to be mounted into a tire of a vehicle wheel, e.g. at an inner side of a tire running surface, i.e. at an inner surface of the tire opposite a tire tread. The wheel unit can be replaceably mounted, so that it may be transferred from a tire to another tire or from a rim to another rim.

The wheel unit may be implemented with any kind of power supply. In an embodiment, the wheel unit is supplied by a battery or an accumulator.

Preferably, the wheel unit comprises a receiver for receiving data telegrams, e.g. LF data telegrams, i.e. data telegrams which are transmitted via LF (low frequency) communication, from a transmitter of the vehicle or from an external transmitter for allowing to send software code and/or data (in particular e.g. the wheel type data) to the wheel unit. This enables the driver of the respective vehicle or workshop personnel to program or re-program the wheel type data stored in the wheel unit as required.

Insofar, the transmitter of the wheel unit can be combined with a receiver in the wheel unit, resulting in a "transceiver". Analogously, the vehicle-mounted receiver can be combined with a transmitter, resulting in a transceiver, for enabling said programming or re-programming of the program code and/or data stored in the storage of the wheel unit.

The storage of the wheel unit may comprise a non-volatile RAM, a flash memory etc.

The processor of the wheel unit is preferably a microcontroller operated by a processing software which is stored in the storage storing also the wheel type data. In another embodiment, the processor is coupled to another storage for storing the processing software for the operation of the processor.

For the RF-transmission of the data telegrams, ISM-band-frequencies like 315 MHz, 433 MHz or other frequencies may be used in accordance with the legal regulations of the respective countries.

A preferred application of the invention is the RF-transmitting of data telegrams within a tire pressure monitoring system (TPMS) which is also referred to as a tire information system (TIS).

In an embodiment, the wheel unit further comprises at least one sensor device for detecting at least one operation parameter of the respective vehicle wheel, as e.g. a pressure inside a tire of the wheel and/or a rotary speed of the wheel and/or a rotary position of the wheel, wherein an information about the at least one operation parameter is incorporated into the data telegrams to be transmitted by the transmitter of the wheel unit.

To this end, the sensor device may comprise e.g. a sensor for measurement of such an operation parameter (e.g. tire pressure) and/or a sensor for measurement of a physical quantity (e.g. acceleration at the mounting position of the wheel unit), allowing to derive such an operation parameter (e.g. rotary speed of the wheel and/or a rotary position of the wheel) from the measured physical quantity.

In an embodiment of particular interest, the vehicle wheel comprises a replaceable rim with a replaceable tire mounted thereon.

In this case, the wheel type data preferably represent information at least related to the type (e.g. manufacturer, model etc., but also e.g. physical properties as dimensions, material properties etc.) of the tire.

Alternatively or additionally, the wheel type date may relate to such information in regard of the rim.

In an embodiment, the vehicle is a motor vehicle, e.g. a passenger car or a truck. In such cases, a wheel unit according to the invention may be provided for each of a plurality of vehicle wheels, wherein in the respective system or method for transmitting the data telegrams, the vehicle-based components or method steps may be commonly used for the transmissions from each of the vehicle wheels.

According to a further aspect of the present invention, a computer program product is disclosed comprising a program code for performing the steps of a method according to the previous aspect of the present invention when said computer program product is run on a data processing device.

BRIEF DESCRIPTION OF THE DRAWINGS

The invention will now be described in more detail by way of example embodiments with reference to the accompanying drawings, in which.

DESCRIPTION OF THE PREFERRED EMBODIMENTS

Figure 1:
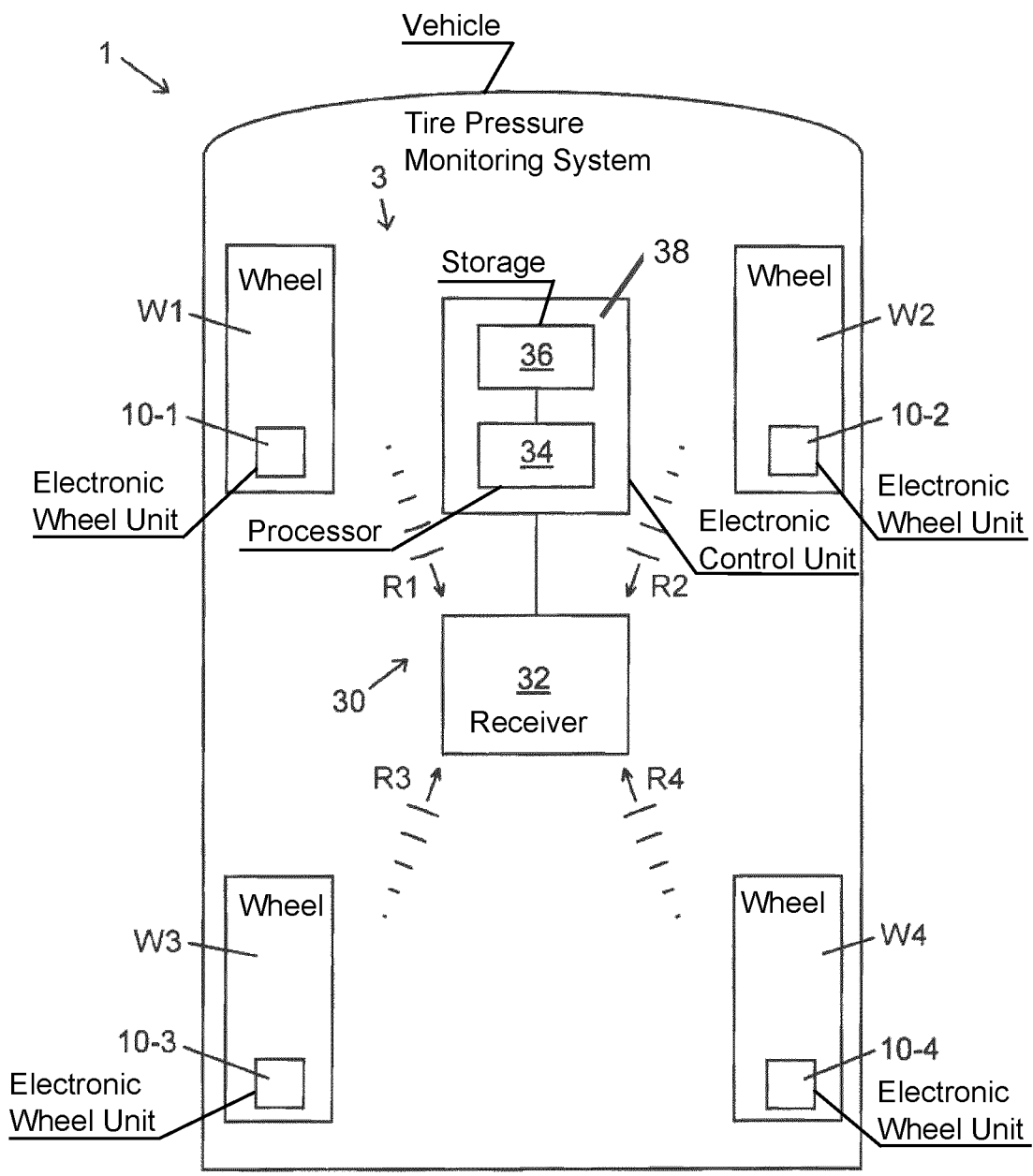
FIG. 1 is a schematic view of a vehicle equipped with a tire pressure monitoring system (TPMS)

FIG. 1 illustrates a vehicle 1, here a passenger car having four vehicle wheels W1 to W4.

The wheels W1 to W4 each comprise a rim and a tire mounted on the respective rim.

In the illustrated embodiment, each tire is equipped with an electronic wheel unit 10-1, 10-2, 10-3 or 10-4, respectively, wherein these wheel units 10-1 to 10-4 each are mounted for example at an inner side of a running surface of the respective tire. Alternatively, each of the wheel units may for example be mounted on the rim of the respective wheel, e.g. connected to respective valve devices of the e.g. air-filled wheels.

The wheel units 10-1 to 10-4 each are designed to detect at least one operation parameter at the respective wheel (here e.g. the tire pressure at the respective one of the wheels W1 to W4) and to transmit at least one or more respective data telegrams R1, R2, R3 or R4, respectively, containing information about one or more such operation parameter(s), to a vehicle-mounted central receiver 32. The receiver 32 is a component of the on-board electronics of the vehicle 1.

In the illustrated example, each of the wheel units 10-1 to 10-4 measures an air pressure in the respective (air-filled) tire as well as an acceleration (at the location of the tire at which the wheel unit is mounted) as such operation parameters.

As the case may be, further operation parameters may be measured (and/or derived from the result of a measurement of other physical quantities at the respective wheel) by each of the wheel units 10-1 to 10-4.

Based on the result of the measurements of air pressure and acceleration, each wheel unit 10-1 to 10-4 forms the respective data telegrams R1 to R4 which are transmitted via RF (radio frequency) communication to the receiver 32 of the vehicle 1.

Figure 2:
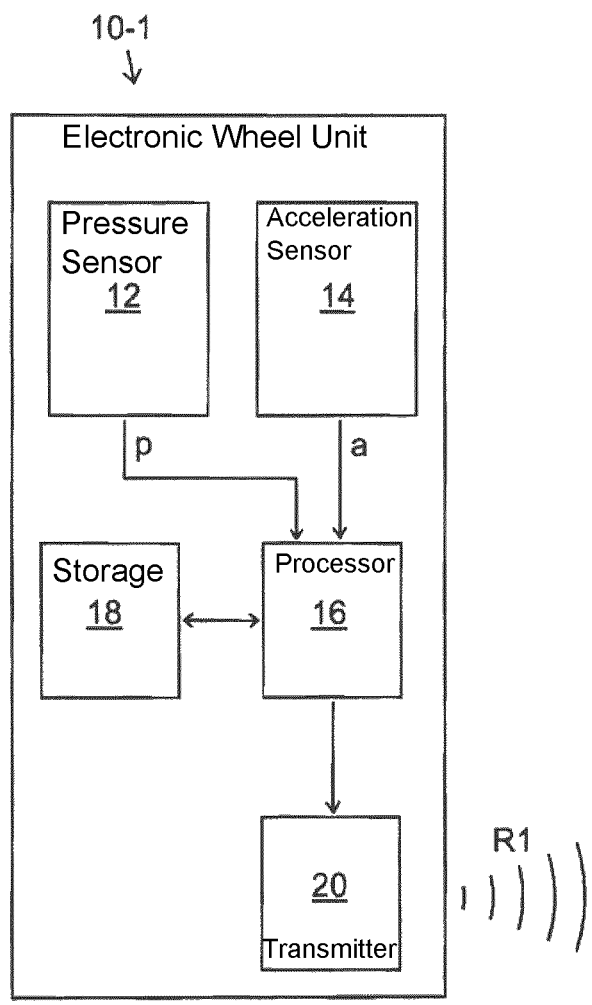
FIG. 2 is a block diagram of a wheel unit used in the vehicle of FIG. 1.

FIG. 2 illustrates a block diagram of the wheel unit 10-1, which will now be described in more detail. The other wheel units 10-2 to 10-4 have the same structure, so that a detailed description thereof is omitted in order to avoid repetition.

Referring to FIG. 2, the wheel unit 10-1 comprises a pressure sensor 12 for providing a sensor signal "p" representative of the air pressure in the tire of the wheel W1 and an acceleration sensor 14 for providing a sensor signal "a" representative of the acceleration at the mounting position of the wheel unit 10-1.

Further, the wheel unit 10-1 comprises a software-controlled processor 16 (e.g. microcontroller) and an associated storage 18 (e.g. non-volatile RAM) for storing of software code and other data. These other data in particular comprise wheel type data related to the type of the wheel W1 at which the respective wheel unit 10-1 is mounted.

The processor 16 creates the data telegrams R1 containing information about the actual tire pressure, the actual rotational speed of the wheel W1 and e.g. the actual length of the footprint of the respective tire. The latter operation parameters "rotational speed" and "footprint length" can be determined by the processor 16 based on an analysis of the acceleration sensor signal "a".

In the generation of the data telegrams R1, as the case may be, the processor 16 may use not only the sensor signals "p" and "a" from the respective sensors 12 and 14, but also one or more data elements of the wheel type data stored in the storage 18. In this way, for example, the generated data telegrams R1 may contain not only information about the respective operation parameter(s) as such, but also about the appropriateness of the detected operation parameter(s) for the actually mounted wheel W1.

Further, the wheel unit 10-1 comprises a transmitter for RF-transmitting the data telegrams R1 which have been previously generated by the processor 16 to the receiver 32 of the vehicle 1.

The processor 16 is further designed for processing the wheel type data stored in the storage 18 to determine an RF power value based on the stored wheel type data and to further communicate the determined RF power value to the transmitter 20.

The transmitter 20 is designed to transmit the data telegrams R1 with an RF power based on the RF power value communicated from the processor 16.

In other words, the processor 16 accomplishes a variable setting of the RF power with which the transmitter 20 is operated in the RF-communication of the data telegrams R1.

For example, the RF power may be set to a higher value for a relatively broad rim and/or a relatively broad tire (in comparison to cases in which the wheel type data indicate a relatively narrow rim or tire, respectively). Correspondingly, the processor 16 may set the RF power to a higher value for a rim or tire, respectively, having a relatively high RF damping factor (in comparison to cases in which the wheel type data indicate a relatively low damping factor of the rim or tire, respectively).

In an embodiment, this setting (updating) of the RF power is provided from time to time, e.g. periodically.

In another embodiment, this setting is provided when required, i.e. when the processor 16 has recognized that wheel type data stored in the storage 18 have been changed. Such change may be caused e.g. by workshop personnel upon a change of the respective vehicle wheel, i.e. a change of the respective tire and/or rim. For this purpose, the wheel unit 10-1 is further equipped with means for enabling such programming or re-programming of the wheel type data stored in the storage 18. Such programming or re-programming by workshop personnel may be provided by means of e.g. LF communication of the respective data to the wheel unit 10-1.

Advantageously, the described structure and operation of the wheel unit 10-1 allows reducing the power consumption of the wheel unit when operated in a system or using a method for RF-transmitting data from the wheel unit mounted to a wheel of a vehicle to a receiver of the vehicle. The same applies for the other wheel units 10-2 to 10-4.

Referring again to FIG. 1, the data telegrams R1 transmitted by the wheel unit 10-1, and correspondingly the data telegrams R2 to R4 transmitted by the wheel units 10-2 to 10-4, respectively, are received by the vehicle-mounted receiver 32 and communicated (e.g. via a digital data communication bus) to a central electronic control unit (ECU) 38 comprising a processor 34 (e.g. a microcontroller) and an associated storage 36 (e.g. a non-volatile RAM).

By means of a control software stored in the storage 36, the processor 34 accomplishes a plurality of control functions within the vehicle 1.

In particular, the receiver 32 and the electronic control unit 38 on the one hand and the wheel units 10-1 to 10-4 on the other hand form a tire pressure monitoring system (TPMS) 3. Apparently, the tire pressure monitoring system 3 can be used to generate and output warnings e.g. in case of an excessive loss of tire pressure at any of the vehicle wheels W1 to W4.

Figure 3:
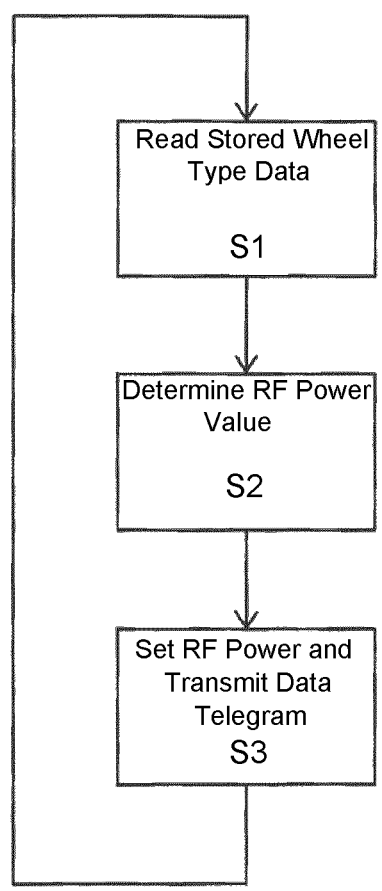
FIG. 3 is a flowchart of a method for transmitting data accomplished by the wheel unit of FIG. 2.

FIG. 3 illustrates a flowchart containing the main steps of a method conducted by the wheel unit 10-1 for transmitting the data telegrams R1 (and conducted correspondingly by the wheel units 10-2 to 10-4 for transmitting the data telegrams R2 to R4, respectively).

In a step S1, the processor 16 reads the stored wheel type data from the storage 18.

In a step S2, the processor 16 determines an RF power value based on the stored wheel type data and communicates the RF power value to the transmitter 20 (together with a data telegram R1 to be transmitted). Further, the processor 16 generates the (contents of the) data telegram(s) R1 to be subsequently transmitted based on a processing of the previously received sensor signals "p" and "a" from the sensors 12 and 14.

In a step S3, the transmitter 20 transmits the data telegram R1 with an RF power set in accordance with the communicated RF power value.

In a further embodiment, the processor 16 is designed to determine a change of the wheel W1 based on a change of the stored wheel type data. In said embodiment, the processor 16 is further designed to determine the RF power value based on the changed wheel type data if the processor 16 determines a change of the wheel W1. Thus, the change of the wheel W1, e.g. a tire change and/or a rim change, may be detected automatically by the processor 16 based on a change of the stored wheel type data and the RF power may be adapted automatically, if a change of the wheel W1 is detected by the processor 16.

LIST OF REFERENCE SIGNS 1 vehicle
3 tire pressure monitoring system
W1 to W4 vehicle wheels
10-1 to 10-4 electronic wheel units
R1 to R4 RF data telegrams
12 pressure sensor
14 acceleration sensor
16 processor (of wheel unit)
18 storage (of wheel unit)
20 RF transmitter
32 RF receiver
34 processor (of ECU)
36 storage (of ECU)
38 electronic control unit
S1 reading of wheel type data
S2 determination of RF power value
S3 setting of RF power

The invention claimed is:

1. A wheel unit for a system for transmitting data from the wheel unit to a receiver of a vehicle, wherein the wheel unit is configured for mounting to a wheel of the vehicle, the wheel unit comprising:
 a memory configured for storing wheel type data related to a type of the wheel at which the wheel unit is mounted;
 a processor configured for processing the wheel type data stored in said memory; and
 a transmitter configured for RF-transmitting data telegrams to a vehicle-mounted receiver;
 wherein said processor is configured to determine an RF power value based on the stored wheel type data, and said transmitter is configured to transmit the data telegrams with an RF power based on the RF power value determined by said processor;
 wherein the wheel type data indicates at least one property selected from the group consisting of a physical property of a tire of the wheel unit and a physical property of a rim of the wheel unit.

2. The wheel unit according to claim 1, wherein said processor is configured to determine a change of the wheel based on a change of the stored wheel type data.

3. The wheel unit according to claim 2, wherein said processor is configured to determine the RF power value based on the changed wheel type data if the processor determines a change of the wheel.

4. The wheel unit according to claim 1, wherein said processor is configured to conduct a calculation based on one or more data elements contained in the wheel type data.

5. The wheel unit according to claim 1, wherein said processor is configured to retrieve one or more values of the RF power value from a look-up table stored in the memory based on one or more data elements contained in the wheel type data.

6. The wheel unit according to claim 1, wherein the stored wheel type data ensures that the RF power value determined by said processor is based on a damping of the RF signal caused by at least one component selected from the group consisting of a rim of the wheel and a tire of the wheel.

7. A system for transmitting data from a wheel unit configured to be mounted to a wheel of a vehicle to a receiver of the vehicle, the system comprising:
   a wheel-mounted wheel unit according to claim 1; and
   a vehicle-mounted receiver for RF-receiving data telegrams transmitted by said wheel unit.

8. The system according to claim 7, wherein the stored wheel type data ensures that the RF power value determined by said processor is based on a damping of the RF signal caused by at least one component selected from the group consisting of a rim of the wheel and a tire of the wheel.

9. A method for transmitting data from a wheel unit mounted to a wheel of a vehicle to a receiver of the vehicle, the method comprising:
   storing wheel type data related to a type of the wheel at which the wheel unit is mounted in a memory of the wheel unit;
   processing the wheel type data stored in the memory by a processor of the wheel unit, for determining an RF power value based on the wheel type data stored in the memory; and
   RF-transmitting data by a transmitter of the wheel unit to the receiver of the vehicle, the transmitter transmitting with an RF power based on the RF power value determined by the processor;
   wherein the wheel type data indicates at least one property selected from the group consisting of a physical property of a tire of the wheel unit and a physical property of a rim of the wheel unit.

10. The method according to claim 9, further comprising determining a change of the wheel based on a change of the stored wheel type data.

11. The method according to claim 10, wherein determining the RF power value comprises determining an RF power value based on the changed wheel type data if a change of the wheel has been determined.

12. The method according to claim 9, wherein the stored wheel type data ensures that the RF power value determined by the processor is based on a damping of the RF signal caused by at least one component selected from the group consisting of a rim of the wheel and a tire of the wheel.

13. A non-transitory computer program product, comprising program code for performing the method according to claim 9 when the program code is executed on a data processing device.

14. The non-transitory computer program product according to claim 13, wherein the stored wheel type data ensures that the RF power value determined by said processor is based on a damping of the RF signal caused by at least one component selected from the group consisting of a rim of the wheel and a tire of the wheel.

* * * * *